US011933099B1

(12) United States Patent
Richison

(10) Patent No.: US 11,933,099 B1
(45) Date of Patent: Mar. 19, 2024

(54) REINFORCED GATE THAT FACILITATES FIELD ASSEMBLY IN MULTIPLE CONFIGURATIONS

(71) Applicant: Brett Jason Richison, Jenks, OK (US)

(72) Inventor: Brett Jason Richison, Jenks, OK (US)

( * ) Notice: Subject to any disclaimer, the term of this patent is extended or adjusted under 35 U.S.C. 154(b) by 474 days.

(21) Appl. No.: 17/321,145

(22) Filed: May 14, 2021

Related U.S. Application Data

(60) Provisional application No. 63/026,370, filed on May 18, 2020.

(51) Int. Cl.
*E06B 11/02* (2006.01)

(52) U.S. Cl.
CPC .................................... *E06B 11/02* (2013.01)

(58) Field of Classification Search
CPC . E04H 17/1413; E04H 17/1417; E04H 17/20; E04H 17/17; E04H 17/168; E04H 17/166; E04H 17/1447; E04H 17/1488; E04H 17/165; E04F 11/181; E04F 11/1851; E06B 11/02
USPC ............................................................ 256/73
See application file for complete search history.

(56) References Cited

U.S. PATENT DOCUMENTS

| | | | | |
|---|---|---|---|---|
| 2,789,792 A | | 4/1957 | Davis | |
| 2,873,094 A | | 2/1959 | Blum | |
| 3,037,593 A | | 6/1962 | Webster | |
| 3,157,255 A | | 11/1964 | Sondheim | |
| 3,195,864 A | * | 7/1965 | Case | E04H 17/1413 256/65.11 |
| 3,395,489 A | | 8/1968 | Banse | |
| 3,454,262 A | | 7/1969 | Romano | |
| 3,522,933 A | | 8/1970 | Braun, III | |
| 3,648,981 A | | 3/1972 | Allen | |
| 3,770,245 A | * | 11/1973 | Murdock | E04F 11/1851 256/65.08 |
| 3,799,506 A | * | 3/1974 | Schwartz | E04H 17/1408 256/37 |

(Continued)

FOREIGN PATENT DOCUMENTS

| | | |
|---|---|---|
| CA | 2683274 | 4/2010 |
| FR | 2846195 | 4/1989 |

OTHER PUBLICATIONS

Bradford. “Modular Fence Frame System”, Jul. 27, 2011, Publisher: www.invention.net/bradford.htm.

*Primary Examiner* — Daniel J Wiley
(74) *Attorney, Agent, or Firm* — James F. Lea, III; Gable Gotwals

(57) ABSTRACT

An gate adapted for field assembly includes an upright and a stiffener slidably received within the upright. A horizontal member communicates with the upright and has a leg that is received between a leg of the stiffener and a leg of the upright for providing a tight assembly and for providing multiple adjacent layers for receiving a fastener. An end of the horizontal member may be separated from an inside surface an upright by a gap for permitting drainage. A spacer receiving groove may be provided for receiving a spacer for occupying a selected amount of a space between the first leg and the second leg for accommodating infill of a desired size. The stiffener may define an enclosing panel having an outside surface for providing a stop to infill and for defining an enclosed area for hiding screws and accessory internals.

24 Claims, 8 Drawing Sheets

(56) References Cited

U.S. PATENT DOCUMENTS 3,879,017 A * 4/1975 Maxcy .................. E04F 11/181 256/22
3,918,686 A 11/1975 Knott et al.
4,055,909 A 11/1977 Perry
4,132,390 A * 1/1979 Pfarr, Jr. ............... E04H 17/163 256/73
4,159,820 A 7/1979 Parisien
4,188,019 A 2/1980 Meredith
4,390,165 A * 6/1983 Murdock .............. E04F 11/181 256/65.02
4,804,166 A 2/1989 Makus
4,809,955 A 3/1989 Villeux
4,905,970 A * 3/1990 Holmsten .............. A63C 19/10 256/73
5,192,056 A 3/1993 Espinueva
5,360,121 A 11/1994 Sothman
5,480,126 A 1/1996 Teasdale
5,529,288 A 6/1996 Cheng-I
5,533,848 A 7/1996 Davis
5,553,422 A 9/1996 Gazaway
5,575,127 A 11/1996 O'Neal
5,702,090 A * 12/1997 Edgman .............. E04H 17/1426 256/65.02
5,758,459 A 6/1998 Koike et al.
5,938,184 A 8/1999 Desouza
5,988,599 A 11/1999 Forbis
6,012,244 A 1/2000 Begum et al.
6,041,486 A 3/2000 Forbis
6,131,888 A * 10/2000 Brown ................ E04H 17/1439 256/65.03
6,152,428 A * 11/2000 Simioni ................ E04H 17/166 256/19
6,202,987 B1 3/2001 Forbis
6,289,641 B1 9/2001 McCandless
6,311,955 B1 11/2001 McGarry et al.
6,345,809 B1 2/2002 Bebendorf
6,364,141 B1 4/2002 Ehrgott
6,398,193 B1 6/2002 Desouza
6,478,287 B2 11/2002 Desouza
6,595,497 B1 7/2003 Linford et al.
6,719,277 B2 4/2004 Ohanesian
6,772,998 B2 8/2004 Bebendorf
6,779,781 B2 8/2004 Bebendorf
6,827,592 B2 12/2004 McCoy et al.
6,840,388 B2 1/2005 Mayer
6,863,326 B1 3/2005 Tiesler et al.
6,877,721 B2 4/2005 Calverley
6,912,817 B1 7/2005 Sabac et al.
7,036,799 B2 5/2006 Shepherd
7,503,550 B2 3/2009 Liefke
7,571,583 B2 8/2009 Winfield
7,635,115 B2 12/2009 Lehmann
7,730,682 B2 6/2010 Nash
D621,061 S 8/2010 Petrucelli et al.
7,775,009 B2 8/2010 King
7,958,684 B2 6/2011 Kleege
7,997,560 B2 8/2011 Bergdoll
8,327,591 B2 12/2012 Wilkinson, Jr. et al.
8,336,273 B2 12/2012 Enns
8,640,761 B2 2/2014 Potter
8,763,303 B2 7/2014 Johnson et al.
2002/0000544 A1* 1/2002 Pettit ........................ E04H 17/16 256/19
2003/0222257 A1 12/2003 Bebendorf
2006/0113517 A1* 6/2006 Colantonio ........... E04H 17/168 256/24
2006/0273502 A1* 12/2006 Sade ..................... E04H 17/168 269/41
2006/0278862 A1 12/2006 Ohanesian
2007/0045602 A1 3/2007 Hathorn, Jr.
2009/0194754 A1 8/2009 Timothy
2010/0096608 A1 4/2010 McCarthy et al.
2010/0314597 A1 12/2010 Rodriguez et al.
2011/0042637 A1 2/2011 Howard et al.
2011/0121249 A1 5/2011 Walker
2013/0248792 A1 9/2013 Bangratz
2013/0320281 A1* 12/2013 Richison ............... E04H 17/166 29/428
2015/0041743 A1* 2/2015 Richison ............. E04H 17/1417 29/428
2017/0370121 A1* 12/2017 Lindsay .............. E04H 17/1413
2019/0071891 A1* 3/2019 Lebrija ................. E04H 17/168
2019/0177997 A1* 6/2019 Springborn ............. E06B 11/02
2019/0186168 A1* 6/2019 Ohrstrom .............. E04H 17/168

* cited by examiner

REINFORCED GATE THAT FACILITATES FIELD ASSEMBLY IN MULTIPLE CONFIGURATIONS

CROSS REFERENCE TO RELATED APPLICATIONS

This application claims the priority of U.S. Provisional Patent Application No. 63/026,370 titled "REINFORCED GATE THAT FACILITATES FIELD ASSEMBLY IN MULTIPLE CONFIGURATIONS," filed May 18, 2020, the contents of which are hereby incorporated by reference.

FIELD OF THE INVENTION

The invention relates to gates in fences. In particular, the gate of the invention is strong and may be assembled in the field in a normal or racked configuration.

BACKGROUND OF THE INVENTION

The use of fences is widespread. Fences are available in various materials and configurations to meet the needs of consumers. For example, common fence types for residential or light commercial use include chain link fence and picket fence. However, variations of these types or configurations of fences are available to provide aesthetic alternatives for consumers.

Some fence variants provide fence panels that are assembled off-site and transported to the installation site. Other fence variants require multiple workers to construct and erect fence panels.

Fence gates present unique challenges for a fence installer. Gates are subject to stresses through repeated use. Square shaped gates often require diagonal reinforcements to prevent sag. Many metallic gates require welding to provide a gate that fits a particular application and that provides the required strength.

SUMMARY OF THE INVENTION

The gate design of the invention simple and strong. The strength of the gate of the invention is due, in part, to a portion of horizontal members being sandwiched between a vertical upright and vertical stiffener to prevent twisting and settling of the gate frame. The vertical components, i.e., the uprights or stiffeners, are designed to facilitate ease of adjustment or cut down to a desired height or width, thereby simplifying installation and providing versatility. The gate assembly of the invention requires no welding.

In one embodiment, the gate includes a first upright. A first stiffener is slidably received within the first upright. A horizontal member has a first end in communication with the first upright and has a second end in communication with the second upright. A first leg of the horizontal member is received between a first leg of the first stiffener and a first leg of the first upright proximate to a first end of the horizontal member.

A second leg of the horizontal member may be received between a second leg of the first stiffener and a second leg of the first upright proximate to a second end of the horizontal member.

At least one of an inside surface of the first leg of the first upright and an inside surface of the second leg of the first upright may define a first internal detent proximate the a base portion. The first end of the horizontal member abuts the first internal detent of the first upright, wherein the first end is separated from an inside surface of a base portion of the first upright by a gap for permitting drainage.

At least one of a first leg and a second leg of the first stiffener may define a spacer receiving groove for receiving a spacer. The spacer is for occupying a selected amount of a space between the first leg and the second leg for accommodating infill of a desired size.

The first upright may be longer than the first stiffener such that an upper end of the first upright may be higher than the upper end of the first stiffener. The first end of the horizontal member may be positioned to abut a base portion of the first stiffener wherein an upper surface of the horizontal member exits the first upright above the upper end of the first stiffener and below the upper end of the first upright. A cap may be received on the upper end of the first upright, wherein the upper surface of the horizontal member exits the first upright beneath the cap.

The first stiffener may define enclosing panel having an outside surface for providing a stop to infill. The enclosing panel may have an inside surface for defining an enclosed area along with an inside surface of the first leg, an inside surface of the second leg and an inside surface of the base of the first stiffener.

An accessory, such as a door knob, may be affixed to the gate. An external portion of the accessory extends outwardly from the first leg of the first upright and an internal portion is received within the enclosed area of the first stiffener.

Benefits of the gate of the invention include strength and simplicity of the three piece design. The strength of the gate of the invention is due, in part, to a portion of the horizontal member being sandwiched between the vertical upright and vertical stiffener to prevent twisting and settling of the gate frame. The gate frame assembly of the invention would be much weaker if one component, such as the stiffener, is removed.

An additional benefit is that the vertical components, i.e., the uprights or stiffeners, can be easily cut down to any height or width to simplify installation and add versatility.

The gate assembly of the invention requires no welding. The components are formed together with sandwich design described above and then formed together with fasteners, such as self-tapping screws, a/k/a, self-drilling screws or nuts and bolts that run through each component, combining them together forming a strong, thick gate frame. In one embodiment, the fasteners pass through three layers of aluminum, thereby contributing to strength of the gate assembly.

The gate assembly of the invention can be constructed onsite and sold in a component form and multiple on-site grade adjustments are possible.

The gate assembly of the invention can be constructed square or constructed to adjust to any grade slope.

The gate assembly of the invention is versatile and designed to accept multiple thicknesses of materials inside the gate frame due to the spacer design embedded into the vertical and horizontal tracks.

The stiffeners may be constructed with an enclosing panel that creates a spacer box for hiding screws or other devices, such as door know internals, that would adversely impact a clean appearance for the assembly. The enclosing panel additionally separates infill from contact with screws or door knob hardware.

Extrusions used in the assembly may be continuous and uniform and may be provided with screw channels for guiding fasteners.

The assembly of the invention allows for wide gates, e.g., 6 feet wide, to be constructed without the use of an angle brace. A further benefit is that the gate has the same appearance on both sides.

DETAILED DESCRIPTION OF THE PREFERRED EMBODIMENTS

Figure 1:
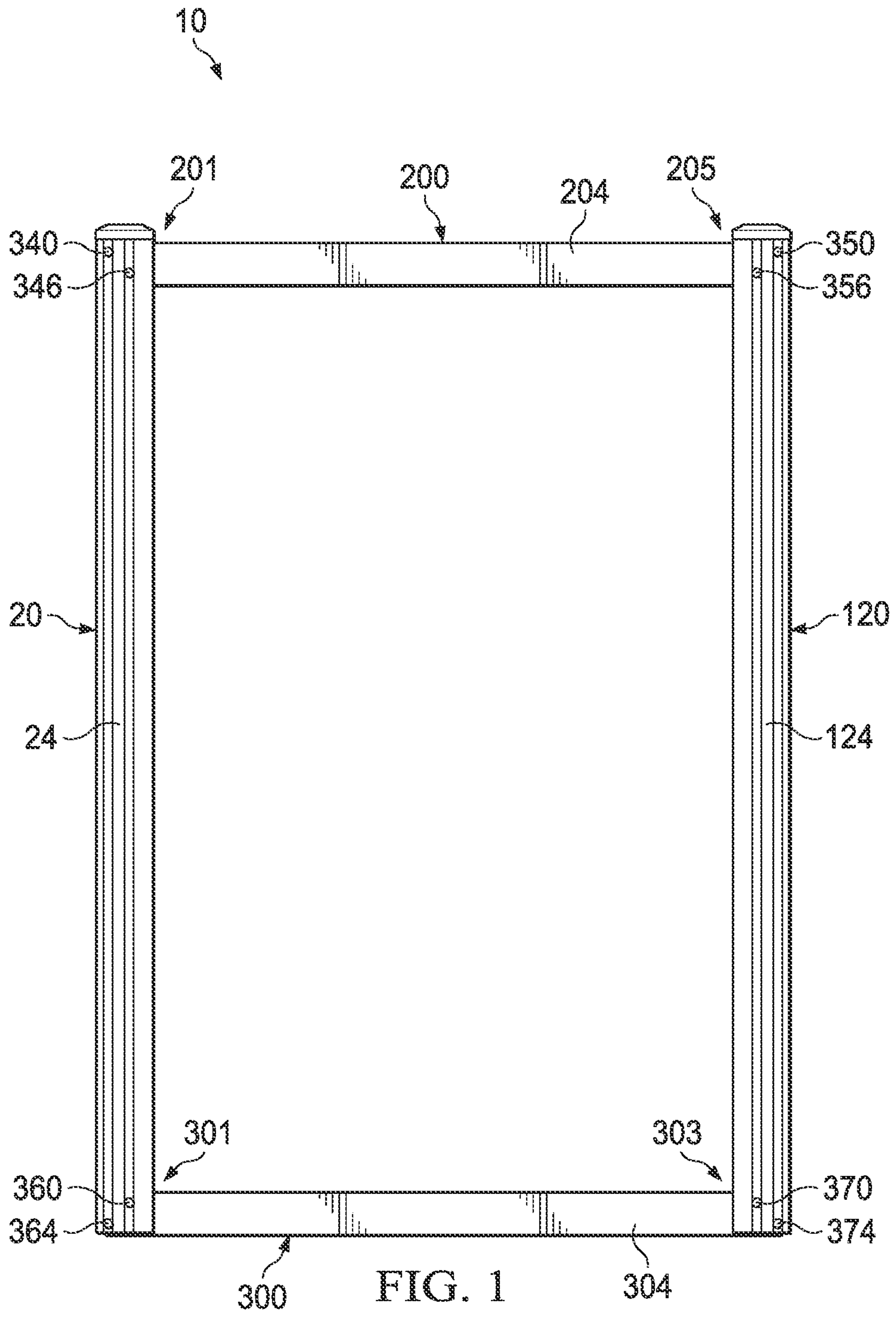
FIG. 1 is an elevation view of an assembled gate of the invention.
Figure 2:
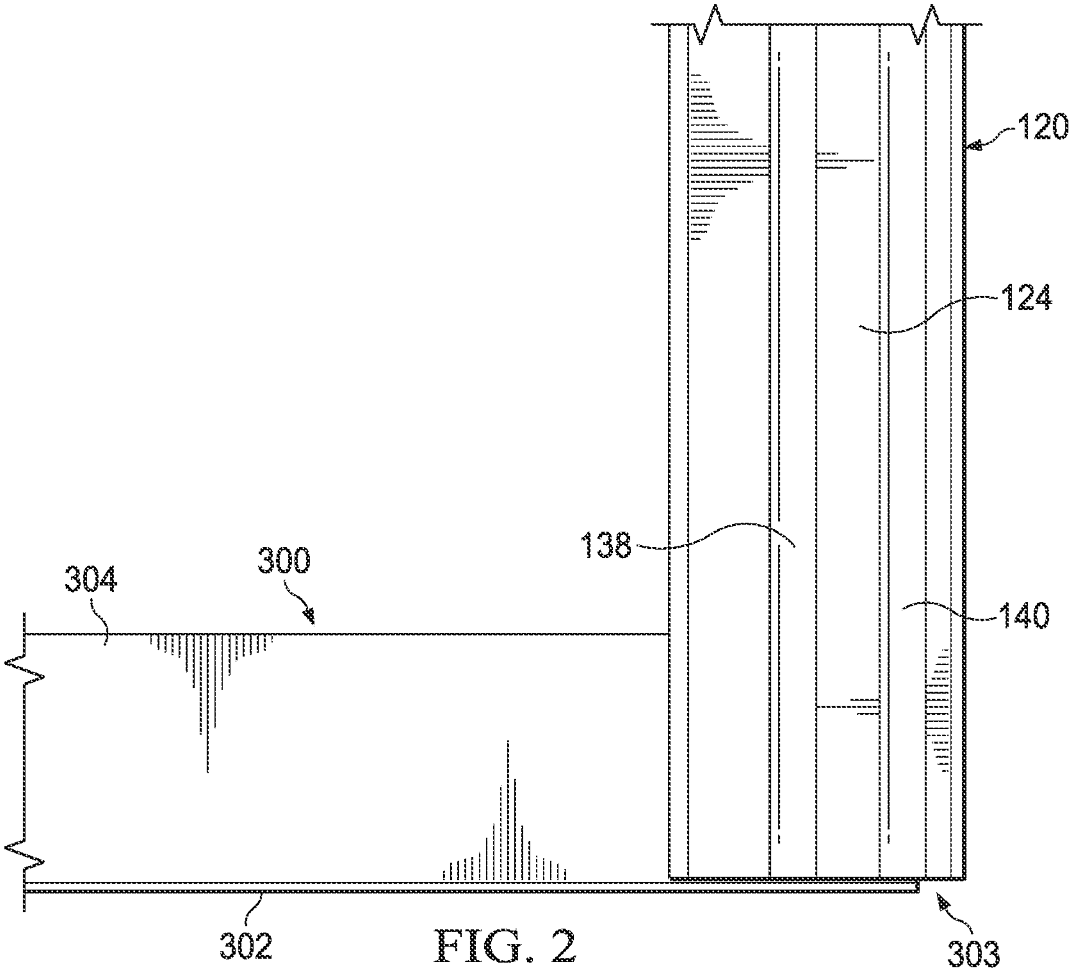
FIG. 2 is an enlarged elevation view of a bottom track and second upright of the assembled gate of FIG. 1.
Figure 3:
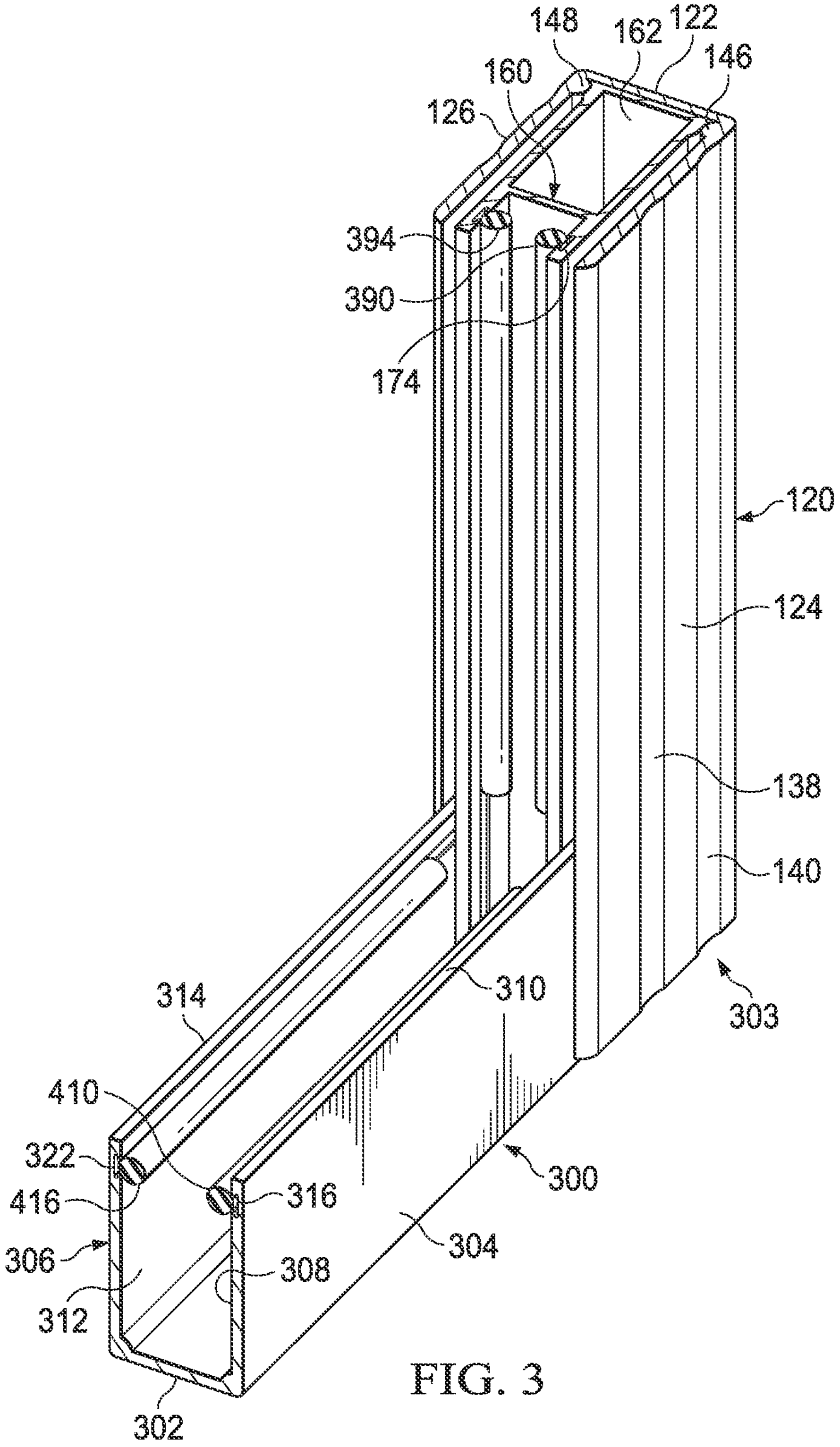
FIG. 3 is a perspective view of the bottom track and second upright of the assembled gate of FIG. 1 wherein a second stiffener may be seen within the second upright.

Referring now to the Figures, shown is a gate designated generally 10. Gate 10 includes first upright 20 having a C shaped cross-section and having a base portion 22 (FIGS. 3, 6, 8, 9), a first leg 24, and a second leg 26. Base portion 22 has an inside surface 28. First leg 24 has an outside surface 30 and an inside surface 32. Second leg 26 has an outside surface 34 and an inside surface 36. Outside surface 34 of first leg 24 defines first screw guide 38 and second screw guide 40. Outside surface 34 of second leg 26 defines first screw guide 42 and second screw guide 44.

Inside surface 32 of first leg 24 defines a first internal detent 46 proximate to base portion 22. Inside surface 36 of second leg 26 defines a second internal detent 48 proximate to base portion 22.

Figure 9:
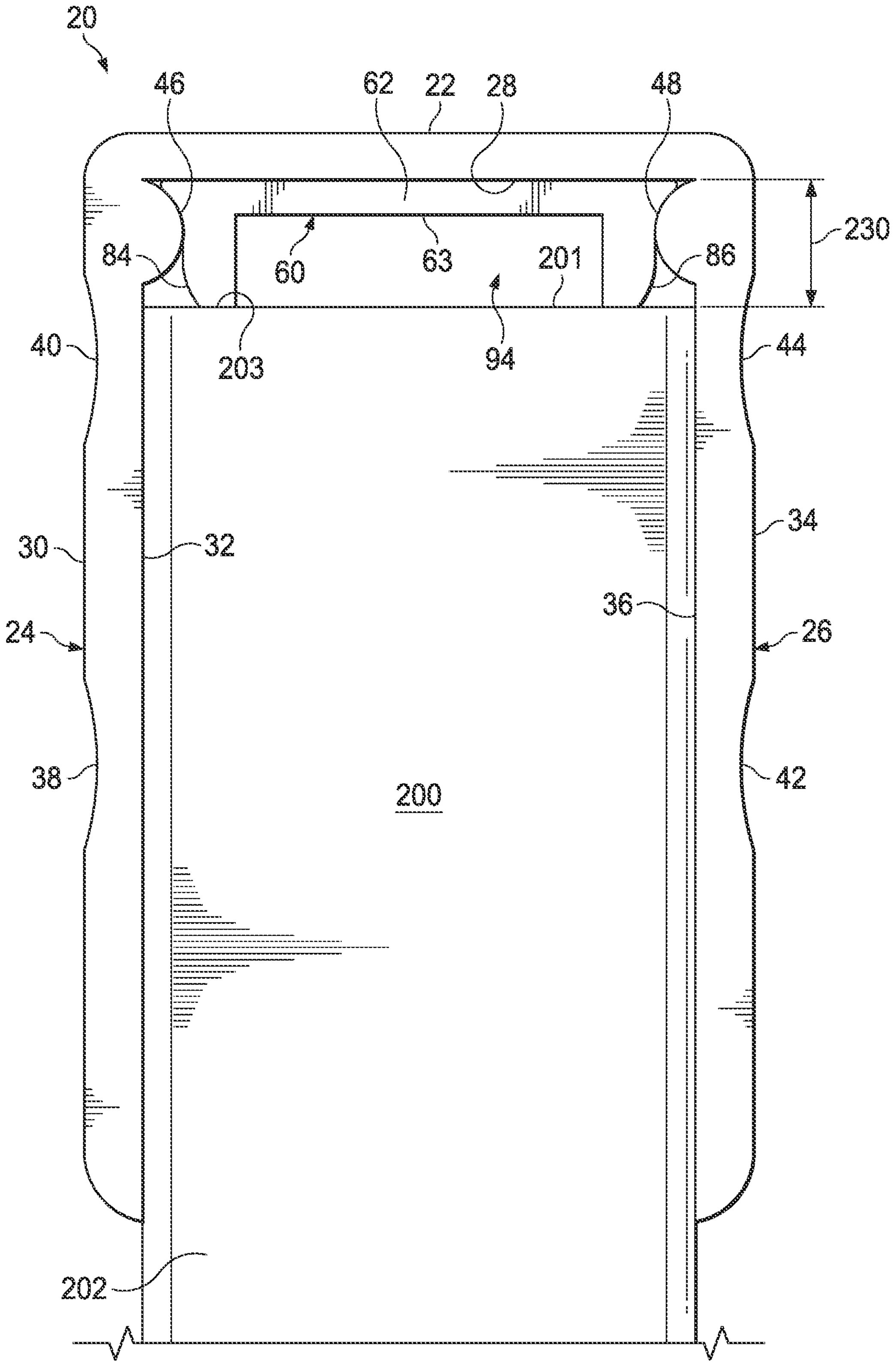
FIG. 9 is a plan view of a top track and first upright of FIGS. 1 and 3 wherein a first stiffener may be seen within the first upright.

First stiffener 60 (FIGS. 3, 6, 7, 9) is slidably received within first upright 20. First stiffener 60 has base portion 62 having inside surface 63, first leg, and second leg. First leg has an outside surface, an inside surface, and a terminal end. The inside surface of the first leg defines a spacer receptacle adjacent the terminal end. A second leg has an outside surface, an inside surface, and a terminal end. The inside surface of the second leg defines a spacer receptacle adjacent the terminal end. The outside surface of the first leg defines first external receiver 84 (FIG. 10) for sliding engagement with first internal detent 46 on inside surface 32 of first leg 24 of first upright 20. The outside surface of the second leg defines second external receiver 86 for sliding engagement with second internal detent 48 of inside surface 36 of second leg 26 of first upright 20. First stiffener 60 defines a first stop member having an inwardly facing surface and an outwardly facing surface. The first stop member connects the inside surface of the first leg to the inside surface of the second leg. The inwardly facing surface is for engaging fill members. The outwardly facing surface of the first stop member, the inside surface of the first leg, inside surface 63 of base portion 62 and inside surface of second leg defines first fastener receiving area 94 (FIG. 9).

Figure 8:
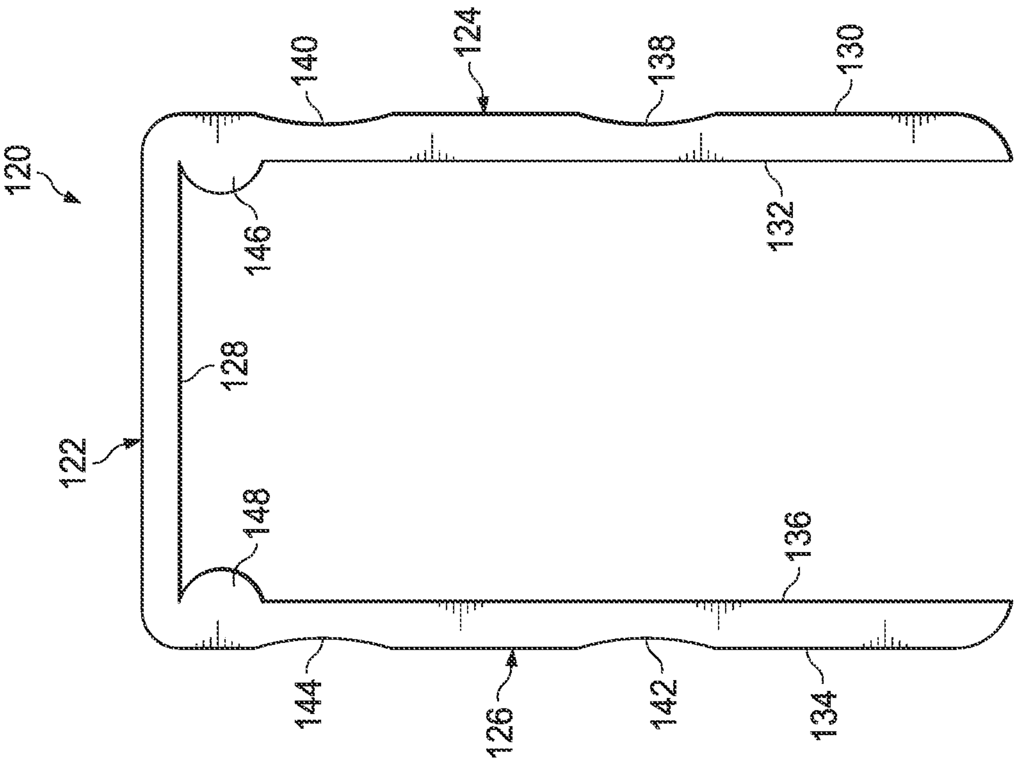
FIG. 8 is a plan view of the second upright of FIGS. 1-6.

The sliding engagement of first external receiver 84 with first internal detent 46 on inside surface 32 of first leg 24 of first upright 20 and sliding engagement of second external receiver with second internal detent 48 on inside surface 36 of second leg 26 of first upright 20 is for slidably securing first upright 20 and first stiffener 60 together. Elements not visible on first stiffener 60 are the same as similarly named elements on second stiffener 160, discussed below. Second upright 120 has a C shaped cross-section with base portion 122 (FIGS. 3, 6, 8), a first leg 124, and a second leg 126. Base portion 122 has inside surface 128 (FIG. 8). First leg has outside surface 130 (FIG. 8) and inside surface 132. Second leg 126 has outside surface (FIG. 8) and inside surface 136. Outside surface 130 of first leg 124 defines first screw guide 138 and second screw guide 140. Outside surface 134 of second leg 126 defines first screw guide 142 and second screw guide 144. Inside surface 132 of first leg 124 defines first internal detent 146 proximate base portion 122. Inside surface 136 of second leg 126 defines a second internal detent 148 proximate base portion 122.

Second stiffener 160 (FIGS. 3, 6, 7) is received within second upright 120. Second stiffener 160 has base portion 162 having an inside surface 163 (FIG. 7), a first leg 164 and a second leg 166. First leg 164 has an outside surface 168, an inside surface 170, and terminal end 172. Inside surface 170 defines spacer receptacle 174 adjacent terminal end 172. Second leg has outside surface 176, inside surface 178, and terminal end 180. Inside surface 178 defines spacer receptacle 182 adjacent terminal end 180. Outside surface 168 of first leg 164 defines first external receiver 184 for sliding engagement with first internal detent 146 of inside surface 132 of first leg 124 of second upright 120. Outside surface 176 of second leg 166 defines second external receiver 186 for sliding engagement with second internal detent 148 of inside surface 136 of second leg 126 of second upright 120. Second stiffener 160 defines second stop member 188 (FIG. 7) having an inwardly facing surface 190 and an outwardly facing surface 192. Second stop member 188 connects inside surface 170 of first leg 164 to inside surface 178 of second leg 166. Second stop member 188 has an inwardly facing surface 190 for engaging fill members. Outwardly facing surface 192 of second stop member 188, inside surface of first leg 164, inside surface 163 of base portion 162, and inside surface 178 of second leg defines second fastener receiving area 194.

Sliding engagement of first external receiver 184 with first internal detent 146 on inside surface 132 of first leg 124 of second upright 120 and sliding engagement second external receiver 186 with second internal detent 148 on inside surface 136 of second leg 126 of second upright 120 for slidably securing second upright 120 and second stiffener 160 together.

Figure 4:
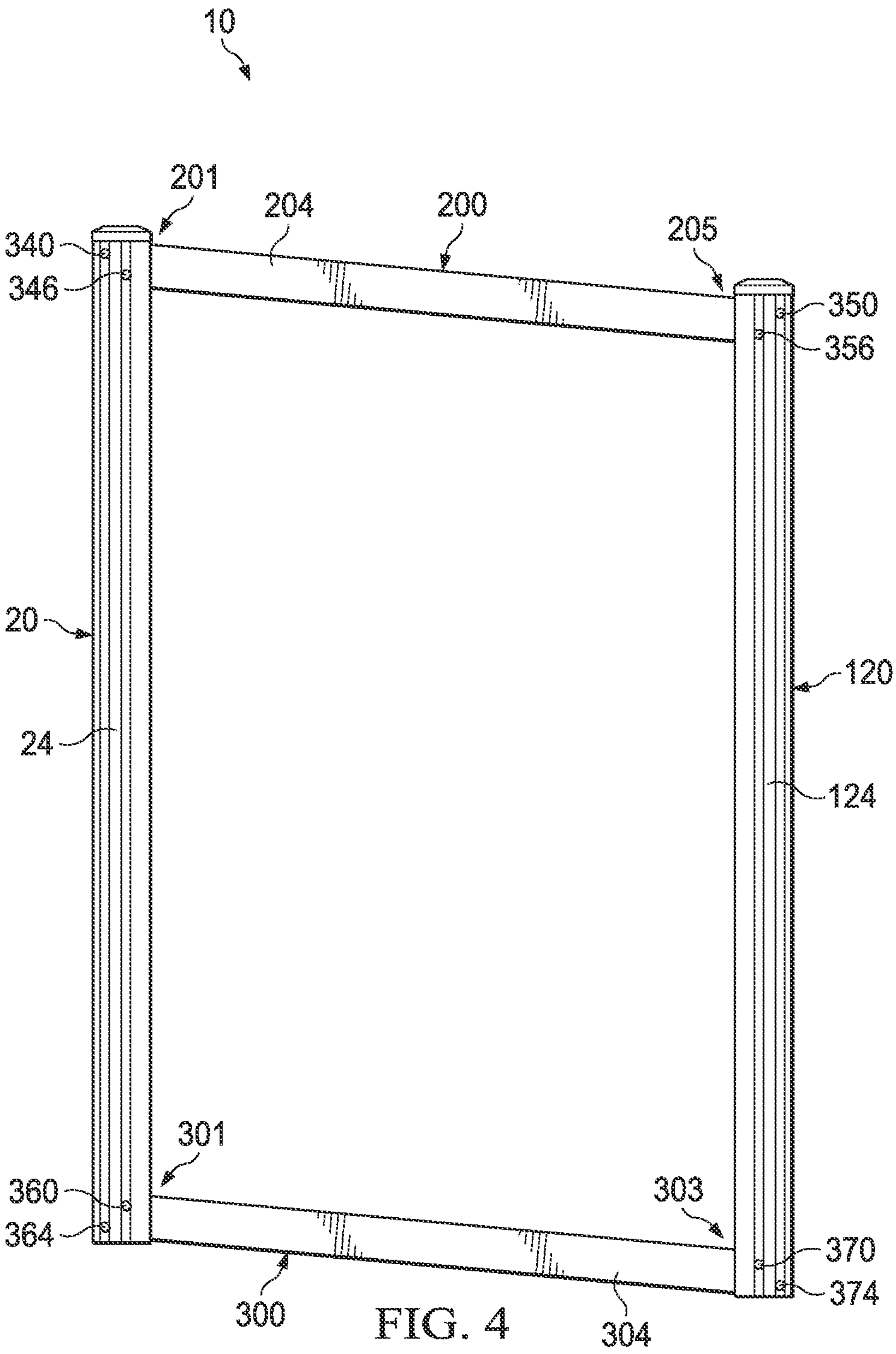
FIG. 4 is an elevation view of an assembled gate of the invention wherein the gate is racked.
Figure 5:
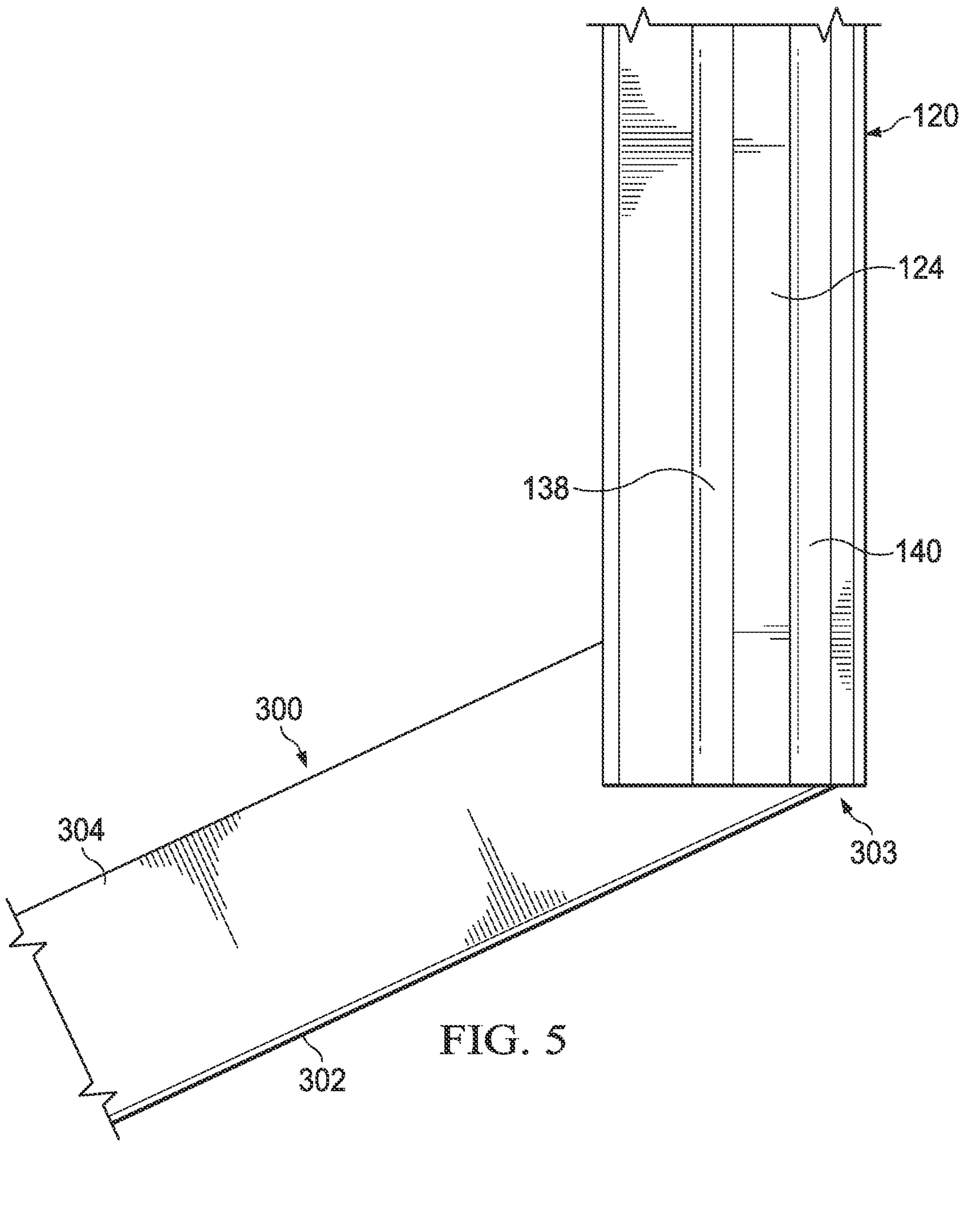
FIG. 5 is an enlarged elevation view of a bottom track and second upright of the assembled gate of FIG. 4.
Figure 6:
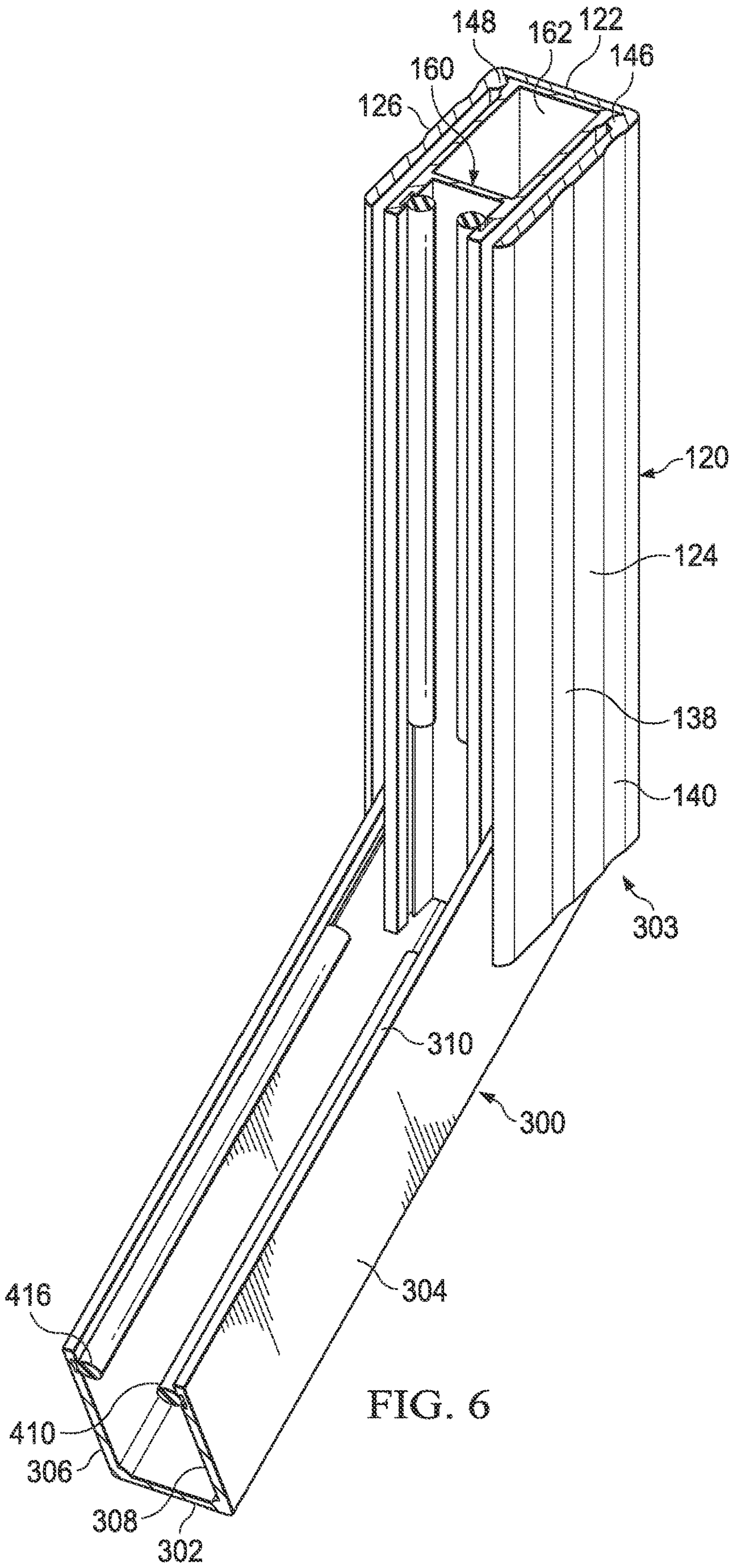
FIG. 6 is a perspective view of the bottom track and second upright of the assembled gate of FIG. 4 wherein a second stiffener may be seen within the second upright.

Top track 200 (FIGS. 1, 4, 9) has a first end 201, a second end 205, and a C shaped cross-section 204 (FIGS. 1 and 4) defining a base member 202 (FIG. 9) defining a terminal end 203, a first leg, and a second leg. Top track 200 spans between first upright 20 and second upright 120. First leg defines an inside surface and a terminal end. The second leg defines an inside surface and a terminal end. The inside surface of the first leg defines a spacer receptacle proximate the terminal end. The inside surface of the second leg defines a spacer receptacle proximate the terminal end. First leg 204 of top track 200 is received between first leg 64 of first stiffener 60 and first leg 24 of first upright 20 adjacent to first end 201 of top track 200. The second leg of top track 200 is received between second leg 66 of first stiffener 60 and second leg 26 of first upright 20 adjacent to second end 205 of top track 200. First leg 204 of top track 200 is received between first leg 164 of second stiffener 160 and first leg 124 of second upright 120 adjacent to second end 205 of top track 200. Second leg of top track 200 is received between second leg of second stiffener 160 and second leg 126 of second upright 120 adjacent to second end 205 of top track 200.

First end 201 of top track 200 is located adjacent first internal detent 46 and second internal detent 48 of first upright 20 (see, e.g., FIG. 9). First end 201 is separated from inside surface 28 of base portion 22 of first upright 20 by gap 230 for permitting drainage. Elements not visible on top track 200 are the same as similarly named elements on bottom track 300, discussed below.

Bottom track 300 (FIGS. 1-6) has a first end 301 and a second end 303, a C shaped cross-section defining base member 302, first leg 304, and second leg 306. Bottom track 300 spans between first upright 20 and second upright 120. First leg 304 defines inside surface 308 (FIGS. 3, 6) and terminal end 310. Second leg 306 defines inside surface 312 (FIGS. 3, 6) and terminal end 314. Inside surface 308 of first leg 304 defines a spacer receptacle 316 proximate terminal end 310. Inside surface 312 of second leg 306 defines spacer receptacle 322 proximate terminal end 314.

First leg 304 of bottom track 300 is received between first leg 64 of first stiffener 60 and first leg 24 of first upright 20 adjacent to first end 301 of bottom track 300. Second leg 306 of bottom track 300 is received between second leg 66 of first stiffener 60 and second leg 26 of first upright 20 adjacent to first end 301 of bottom track 300.

First leg 304 of bottom track 300 is received between first leg 164 of second stiffener 160 and first leg 124 of second upright 120 adjacent to second end 303 of bottom track 300. Second leg 306 of bottom track 300 is received between second leg 166 of second spacer 160 and second leg 126 of second upright 120 adjacent to second end 303 of bottom track 300.

First end 301 of bottom track 300 is located adjacent first internal detent 46 and second internal detent 48 of first upright 20 wherein first end 301 is separate from inside surface 28 of base portion 22 of first upright 20 by a gap for permitting drainage. Second end 303 of bottom track 300 is located adjacent first internal detent 146 and second internal detent 148 of second upright 120 when second end 303 of bottom track 300 is separate from inside surface 128 of base portion 122 of second upright 120 by a gap for permitting drainage.

A first upper top track fastener 340 (FIGS. 1, 4) passes through first leg 24 of first upright 20, through first leg 204 of top track 200, and through first leg 64 of first stiffener 60. First upper top track fastener 340 terminates in first fastener receiving area 94 (FIG. 9).

First lower top track fastener 346 passes through first leg 24 of first upright 20, through first leg 204 of top track 200, and through first leg 64 of first stiffener 60. First lower top track fastener 346 terminates in first fastener receiving area 94.

Figure 7:
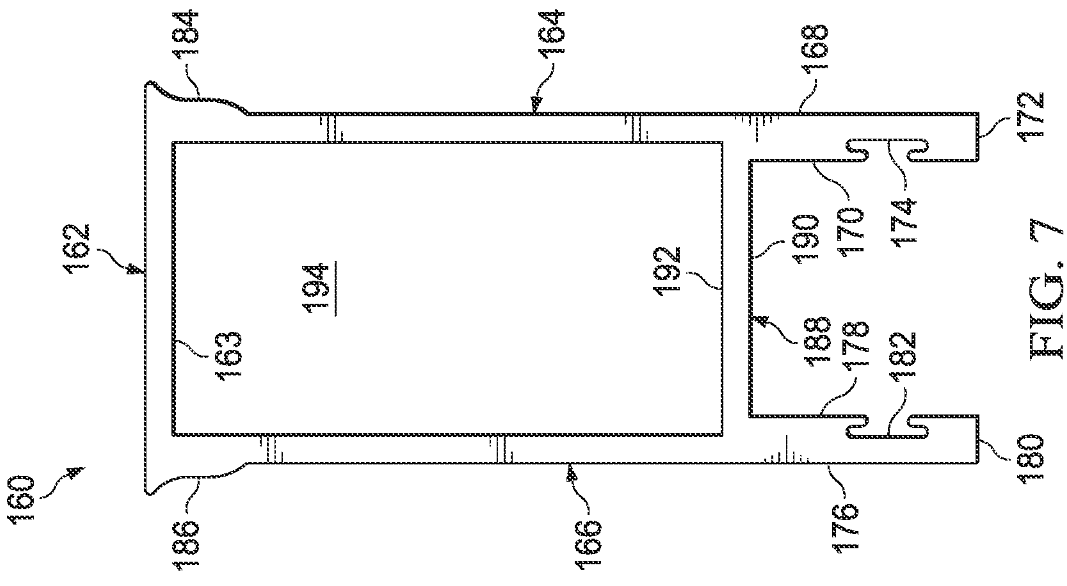
FIG. 7 is a plan view of the second stiffener of FIGS. 3 and 6.

Second upper top track fastener 350 passes through first leg 24 of second upright 120, through first leg 204 of top track 200, and through first leg 164 of second stiffener 160. Second upper top track fastener 350 terminates in second fastener receiving area 194 (FIG. 7).

Second lower top track fastener 356 passes through first leg 124 of second upright 120, through first leg 204 of top track 200, and through first leg 164 of second stiffener 160. Second lower top track fastener 356 terminates in second fastener receiving area 194.

First upper bottom track fastener 360 passes through first leg 24 of first upright 20, through first leg 304 of bottom track 360, and through first leg 64 of first stiffener 60. First upper bottom track fastener 360 terminates in first fastener receiving area 94.

First lower bottom track fastener 364 passes through first leg 24 of first upright 20, through first leg 304 of bottom track 360, and through first leg 64 of first stiffener 60. First lower bottom track fastener 364 terminates in first fastener receiving area 94.

Second upper bottom track fastener 370 passes through first leg 124 of second upright 120, through first leg 304 of bottom track 360, and through first leg 164 of second stiffener 160. Second upper bottom track fastener 370 terminates in second fastener receiving area 194.

Second lower bottom track fastener 374 passes through first leg 124 of second upright 120, through first leg 304 of bottom track 360, and through first leg 164 of second stiffener 160. Second lower bottom track fastener 374 terminates in second fastener receiving area 194.

A first vertical spacer is received in a first spacer receptacle of first leg 64 of first stiffener 60. The first vertical spacer is for engaging and centering a fill member.

A second vertical spacer is received in a second spacer receptacle of second leg 66 of first stiffener 60. The second vertical spacer is for engaging and centering a fill member.

First vertical spacer 390 (FIGS. 3, 6) is received in first spacer receptacle 174 of leg 164 of second stiffener 160. First vertical spacer 390 is for engaging and centering a fill member.

Second vertical spacer 394 is received in second spacer receptacle 182 of second leg 166 of second stiffener 160. Second vertical spacer 394 is for engaging and centering a fill member.

A first horizontal spacer 400 is received in a first spacer receptacle of the inside surface of first leg 204 of top track 200.

A second horizontal spacer is received in a second spacer receptacle of an inside surface of a second leg of top track 200.

First horizontal spacer 410 (FIGS. 3, 6) is received in first spacer receptacle 316 of inside surface 308 of first leg 304 of bottom track 300.

Second horizontal spacer 416 is received in second spacer receptacle 322 of inside surface 312 of second leg 306 of bottom track 300.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The term "at least" followed by a number is used herein to denote the start of a range beginning with that number (which may be a ranger having an upper limit or no upper limit, depending on the variable being defined). For example, "at least 1" means 1 or more than 1.

The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A gate comprising:

a first upright having a base portion, a first leg, a second leg, a height and an upper end;

a second upright having a base portion, a first leg, a second leg and an upper end;

a first stiffener slidably received within said first upright, said first stiffener having a base portion, a first leg, a second leg, a height and an upper end;

a horizontal member having a first end, a second end, a base portion, a first leg, a second leg, and an upper surface, said first end in communication with said first upright and said second end in communication with said second upright, said first leg of said horizontal member received between said first leg of said first stiffener and said first leg of said first upright proximate to said first end of said horizontal member.

2. The gate according to claim 1 wherein:

said second leg of said horizontal member received between said second leg of said first stiffener and said second leg of said first upright proximate to said second end of said horizontal member.

3. The gate according to claim 1 wherein:

at least one of an inside surface of said first leg of said first upright and an inside surface of said second leg of said first upright defines a first internal detent proximate said base portion;

wherein said first end of said horizontal member abuts said first internal detent of said first upright, wherein said first end is separated from an inside surface of said base portion of said first upright by a gap for permitting drainage.

4. The gate according to claim 1 wherein:

at least one of said first leg and said second leg of said first stiffener defines a spacer receiving groove;

a spacer received in said spacer receiving groove for occupying a selected amount of a space between said first leg and said second leg for accommodating infill of a desired size.

5. The gate according to claim 1 wherein:

said upper end of said first upright is higher than said upper end of said first stiffener;

said first end of said horizontal member abuts said base portion of said first stiffener;

said upper surface of said horizontal member exits said first upright above said upper end of said first stiffener and below said upper end of said first upright.

6. The gate according to claim 1 wherein:

said first stiffener further comprises an enclosing panel having an outside surface for providing a stop to infill and having an inside surface for defining an enclosed area along with an inside surface of said first leg, an inside surface of said second leg and an inside surface of said base of said first stiffener.

7. A gate comprising:

a first upright having a base portion having an inside surface, a first leg, a second leg, and an upper end, said first leg having an outside surface and an inside surface, said second leg having an outside surface and an inside surface, at least one of said inside surface of said first leg and said inside surface of said second leg defining an internal detent proximate said base portion;

a second upright having a base portion, a first leg and a second leg, said base portion having an inside surface, said first leg having an outside surface and an inside surface, said second leg having an outside surface and an inside surface;

a first stiffener received within said first upright, said first stiffener having a base portion, a first leg, a second leg, and an upper end;

a horizontal member having a first end, a second end, a base member, a first leg, a second leg, and an upper surface, said first leg defining an inside surface, said second leg defining an inside surface, said horizontal member spanning between said first upright and said second upright;

wherein said first end of said horizontal member abuts said internal detent of said first upright, wherein said first end of said horizontal member is separated from said inside surface of said base portion of said first upright by a gap for permitting drainage.

8. The gate according to claim 7 wherein:

said first leg of said horizontal member received between said first leg of said first stiffener and said first leg of said first upright proximate to said first end of said horizontal member.

9. The gate according to claim 7 wherein:

at least one of said first leg and said second leg of said first stiffener defines a spacer receiving groove;

a spacer received in said spacer receiving groove for occupying a selected amount of a space between said first leg and said second leg for accommodating infill of a desired size.

10. The gate according to claim 7 wherein:

said upper end of said first upright is higher than said upper end of said first stiffener;

said first end of said horizontal member abuts said base of said first stiffener;

said upper surface of said horizontal member exits said first upright above said upper end of said first stiffener and below said upper end of said first upright.

11. The gate according to claim 7 wherein:

said first stiffener further comprises an enclosing panel having an outside surface for providing a stop to infill and having an inside surface for defining an enclosed area along with an inside surface of said first leg, an inside surface of said second leg and an inside surface of said base portion of said first stiffener.

12. The gate according to claim 11 further comprising:

an accessory having an external portion and an internal portion;

wherein said external portion extends outwardly from said first leg of said first upright;

wherein said internal portion is received within said enclosed area of said first stiffener.

13. A gate comprising:

a first upright having a base portion, a first leg, a second leg, a height and an upper end;

a second upright having a base portion, a first leg, a second leg and an upper end;

a first stiffener slidably received within said first upright, said first stiffener having a base portion, a first leg, a second leg, a height and an upper end;

said upper end of said first upright is higher than said upper end of said first stiffener;

a horizontal member having a first end, a second end, a base portion, a first leg, a second leg, and an upper surface;

wherein said first end of said horizontal member abuts said base portion of said first stiffener;

wherein said upper surface of said horizontal member exits said first upright above said upper end of said first stiffener and below said upper end of said first upright.

14. The gate of claim 13 further comprising:

a cap having a top surface and sidewalls, said cap received on said upper end of said first upright, wherein said upper surface of said horizontal member exits said first upright beneath one of said sidewalls of said cap.

15. The gate according to claim 13 wherein:

at least one of said first leg and said second leg of said first stiffener defines a spacer receiving groove;

a spacer received in said spacer receiving groove for occupying a selected amount of a space between said first leg and said second leg for accommodating infill of a desired size.

16. The gate according to claim 13 wherein:

said first leg of said horizontal member received between said first leg of said first stiffener and said first leg of said first upright proximate to said first end of said horizontal member.

17. The gate according to claim 13 wherein:

at least one of an inside surface of said first leg of said first upright and an inside surface of said second leg of said first upright defines a first internal detent proximate said base portion;

wherein said first end of said horizontal member abuts said first internal detent of said first upright, wherein said first end is separated from an inside surface of said base portion of said first upright by a gap for permitting drainage.

18. The gate according to claim 13 wherein:

said first stiffener further comprises an enclosing panel having an outside surface for providing a stop to infill and having an inside surface for defining an enclosed area along with an inside surface of said first leg, an inside surface of said second leg and an inside surface of said base portion of said first stiffener.

19. A gate comprising:

a first upright having a base portion, a first leg, a second leg, a height and an upper end;

a second upright having a base portion, a first leg, a second leg and an upper end;

a first stiffener slidably received within said first upright, said first stiffener having a base portion, a first leg, a second leg, a height and an upper end;

a horizontal member having a first end, a second end, a base portion, a first leg, a second leg, and an upper surface, said first end in communication with said first upright and said second end in communication with said second upright, wherein said first stiffener further comprises an enclosing panel having an outside surface for providing a stop to infill and having an inside surface for defining an enclosed area along with an inside surface of said first leg, an inside surface of said second leg and an inside surface of said base of said first stiffener.

20. The gate according to claim 19 further comprising:

an accessory having an external portion and an internal portion;

wherein said external portion extends outwardly from said first leg of said first upright;

wherein said internal portion is received within said enclosed area of said first stiffener.

21. The gate according to claim 19 wherein:

said first leg of said horizontal member is received between said first leg of said first stiffener and said first leg of said first upright proximate to said first end of said horizontal member.

22. The gate according to claim 19 wherein:

an inside surface of at least one of said first leg and said second leg of said first upright defines an internal detent proximate said base portion;

wherein said first end of said horizontal member abuts internal detent of said first upright, wherein said first end of said horizontal member is separated from an inside surface of said base portion of said first upright by a gap for permitting drainage.

23. The gate according to claim 19 wherein:

at least one of said first leg and said second leg of said first stiffener defines a spacer receiving groove;

a spacer received in said spacer receiving groove for occupying a selected amount of a space between said first leg and said second leg for accommodating infill of a desired size.

24. The gate according to claim 19 wherein:

said upper end of said first upright is higher than said upper end of said first stiffener;

said first end of said horizontal member abuts said base portion of said first stiffener;

said upper surface of said horizontal member exits said first upright above said upper end of said first stiffener and below said upper end of said first upright.

* * * * *